(12) United States Patent
Wang et al.

(10) Patent No.: US 9,107,068 B2
(45) Date of Patent: Aug. 11, 2015

(54) DEVICE AND METHOD FOR INTER-CELL INTERFERENCE COORDINATION IN RELAY-ASSISTANT CELLULAR NETWORK

(75) Inventors: Jun Wang, Shanghai (CN); Dongyao Wang, Shanghai (CN); Qi Jiang, Shanghai (CN); Jiyong Pang, Shanghai (CN); Jianguo Liu, Shanghai (CN); Gang Shen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 252 days.

(21) Appl. No.: 13/578,202

(22) PCT Filed: Feb. 12, 2010

(86) PCT No.: PCT/CN2010/000204
§ 371 (c)(1),
(2), (4) Date: Aug. 9, 2012

(87) PCT Pub. No.: WO2011/097764
PCT Pub. Date: Aug. 18, 2011

(65) Prior Publication Data
US 2012/0315840 A1 Dec. 13, 2012

(51) Int. Cl.
*H04W 72/00* (2009.01)
*H04W 16/04* (2009.01)
*H04W 84/04* (2009.01)

(52) U.S. Cl.
CPC ............ *H04W 16/04* (2013.01); *H04W 84/047* (2013.01)

(58) Field of Classification Search
CPC ... H04W 84/047; H04W 36/22; H04W 24/10; H04W 36/0094; H04W 28/08; H04W 16/04; H04W 28/26; H04B 7/2606; H04B 7/15528

USPC .......... 455/453, 452.1, 7, 447, 524, 528, 429, 455/443, 449, 451; 370/328, 338, 315
See application file for complete search history.

(56) References Cited

U.S. PATENT DOCUMENTS 8,208,937 B2 * 6/2012 Zhang et al. ................ 455/452.1
8,964,703 B2 * 2/2015 Chen et al. ..................... 370/335
(Continued)

FOREIGN PATENT DOCUMENTS

CN   101146343 A   3/2008
CN   101272549 A   9/2008
(Continued)

OTHER PUBLICATIONS

International Search Report for PCT/CN2010/000204 dated Nov. 18, 2010.
(Continued)

*Primary Examiner* — Nay A Maung
*Assistant Examiner* — Angelica M Perez
(74) *Attorney, Agent, or Firm* — Fay Sharpe LLP

(57) ABSTRACT

The herein described device and method facilitate inter-cell interference coordination (ICIC) in a relay-assistant cellular network by: determining, with respect to a sector, whether the sector is relay overloaded or neighboring sectors of the sector are relay overloaded according to load information of the neighboring sectors of the sector; enabling the sector to borrow relay resources released by the neighboring sectors of the sector if the sector is relay overloaded with respect to the neighboring sectors of the sector; and releasing relay resources allocated to the sector according to load information of the neighboring sectors of the sector if the neighboring sectors are relay overloaded with respect to the sector.

10 Claims, 5 Drawing Sheets

(56) References Cited

U.S. PATENT DOCUMENTS

| | | | |
|---|---|---|---|
| 2007/0129071 A1* | 6/2007 | Shapira | 455/422.1 |
| 2008/0076440 A1 | 3/2008 | Guo et al. | |
| 2008/0194267 A1 | 8/2008 | Ahn et al. | |
| 2009/0163218 A1 | 6/2009 | Liu et al. | |

FOREIGN PATENT DOCUMENTS

| | | |
|---|---|---|
| CN | 101547480 A | 9/2009 |
| CN | 101568123 A | 10/2009 |
| EP | 1662825 A1 | 5/2006 |
| EP | 2 101 528 A1 | 9/2009 |
| JP | 2000-138965 | 5/2000 |
| JP | 2011-505088 | 2/2011 |
| JP | 2011-509587 | 3/2011 |
| KR | 10-2009-0093605 A | 9/2009 |
| WO | 2009/067842 A1 | 6/2009 |
| WO | 2009/084760 A1 | 7/2009 |

OTHER PUBLICATIONS

"3rd Generation Partnership Project; Technical Specification Group Radio Access Network; Further Advancements for E-UTRA Physical Layer Aspects (Release 9)," 3GPP TR 36.814 V1.5.0 (Nov. 2009), Technical Report, pp. 1-53.

Potevio, "On the interference coordination intra-cell through R-PDCCH," Agenda Item: 15.3, Document for: Discussion and Decision, 3GPP TSG RAN WG1 meeting #58, Shenzhen, China, Aug. 24-28, 2009, R1-093444, pp. 1-8.

Supplementary European Search Report of corresponding European Application No. 10845438, dated Oct. 24, 2014.

\* cited by examiner

DEVICE AND METHOD FOR INTER-CELL INTERFERENCE COORDINATION IN RELAY-ASSISTANT CELLULAR NETWORK

FIELD OF THE INVENTION

The present invention relates to a method and device for interference coordination in a cellular system, and more specifically, to a device and method for inter-cell interference coordination in a relay-assistant cellular network.

BACKGROUND OF THE INVENTION

Recently, multi-hop relay technology is widely discussed in the 3rd Generation Partnership Project Long Term Evolution-Advanced (3GPP LTE-A) and Worldwide Interoperability for Microwave Access (WiMAX), which both choose OFDMA as the downlink transmission scheme. In a relay-assistant system, each user equipment (UE) may access a base station eNode-B(eNB) or a relay node (RN) based on certain UE access principles such as maximum receiving power, minimum distance. Therefore, three kinds of links are formed. The link between an eNB and its serving UE (also named a macro UE) is called as a direct link, the link between a relay node (RN) and its serving UE (also named a relay UE) is called as a relay access link, and the link between an eNB and a RN hosted by the eNB is called as a relay backhaul link. With respect to in-band relay, these three kinds of links occupy the whole frequent band of a cell. By using a RN on the cell edge and utilizing the cell's edge frequent band to serve the relay UE, it's expected that not only the relay UE will not suffer inter-cell interference but also the received signal power from the serving RN is improved.

In a relay enhanced multi-cell communication system, the inter-cell interference (ICI) is the main source of downlink interferences. Some inter-cell interference coordination (ICIC) technologies have been proposed based on fractional frequency reuse (FFR). In the FFR, the cell edge UE (i.e. the relay UE) is only allowed to operate on a small portion of all available sub frequency bands. The portion of the frequency bands is allocated such that neighboring cells' edges may operate on mutually orthogonal frequency bands in order to avoid inter-cell interference. UEs that are in the center of a cell (i.e. macro UE) will operate on all or major portions of the available frequency band without any orthogonal limitation, since such UEs are closer to the eNB and thus are free of co-channel interference. When rely is considered, a variation of the FFR is called as partial frequency reuse (PFR), which divides the whole frequency band into two portions. The portion of the frequency band with a reuse factor 3 is called as cell edge frequency band (for the relay UE) and the portion of the frequency band with a reuse factor 1 is called as cell center frequency band (for the relay backhaul and the macro UEs).

FIG. 1 illustrates a schematic drawing of a static ICIC scheme in prior arts.

Generally, the cell edge frequency band is allocated to relay UEs, the cell center frequency band is allocated to macro UEs, and the relay backhaul link may share the cell edge frequency band with the relay UE or share the cell center frequency band with the macro UE. For example, as shown in FIG. 1, three sectors, i.e. sector 0, sector 1 and sector 2, are included in the cell served by the eNB, where a cell edge frequency band F0 is allocated to relay UEs of the sector 0, a cell edge frequency band F1 is allocated to relay UEs of the sector 1, a cell edge frequency band F2 is allocated to relay UEs of the sector 2, and cell center frequency bands F3 are allocated to macro UEs of sectors 0, 1 and 2. The frequency bands F0, F1, F2 and F3 are orthogonal with each other.

FIG. 2 illustrates a typical LTE FDD downlink frame structure.

As shown in FIG. 2, for a typical LTE FDD system, each downlink frame has a length of 10 ms and consists of 20 time slots (numbered from 0 to 19) of 0.5 ms. A subframe is defined as two consecutive time slots where subframe i consists of time slots $2i$ and $2i+1$. In case of 10 MHz system bandwidth, there are total 50 PRBs (physical resource block) in each subframe.

FIG. 3 illustrates a diagram of resource allocation of the static ICIC scheme in case of the frame structure shown in FIG. 2.

As shown in FIG. 3, it is assumed that the relay UEs of sectors 0, 1 and 2 are allocated with 6 PRBs respectively, i.e. the cell edge frequency bands F0 (corresponding to PRB1-PRB6), F1 (corresponding to PRB7-PRB12), F2 (corresponding to PRB13-PRB18) are allocated to the sectors 0, 1 and 2 respectively, and that the macro UEs of sectors 0, 1 and 2 are allocated with 32 PRBs, i.e. the cell center frequency band F3 (corresponding to PRB19-PRB50) is allocated.

However, considering that the UEs are not always uniformly distributed and there may be significant differences between the loads of each relay, the static ICIC scheme equally allocating bandwidth resource within the cell edge limits the use of available spectra within the edge region and reduces the spectra utilization efficiency. By way of the example shown in FIG. 3, when the number of relay (cell edge) UEs within sector 1 is much larger than that of relay (cell edge) UEs within sector 2, serious overload will appear in the sector 1, whereas there may even be unused vacant physical resource blocks (PRB) such as vacant PRB 6, PRB 13 and PRB 14 in the other two sectors. In this case, a dynamic ICIC scheme is required to improve the spectra utilization efficiency

SUMMARY OF THE INVENTION

In view of the problem in the prior arts, the present invention proposes a device and method for inter-cell interference coordination in a relay-assistant cellular network.

According to an aspect of the present invention, there is provided a device for inter-cell interference coordination in a relay-assistant cellular network, comprising: a relay overload determining module for determining, with respect to a sector served by the device, whether the sector is relay overloaded or neighboring sectors of the sector are relay overloaded according to load information of the neighboring sectors of the sector; a relay resource borrowing module for enabling the sector to borrow relay resources released by the neighboring sectors of the sector if the sector is relay overloaded with respect to the neighboring sectors of the sector; and a relay resource releasing module for releasing relay resources allocated to the sector according to load information of the neighboring sectors of the sector if the neighboring sectors are relay overloaded with respect to the sector.

Here, the relay overload determining module may comprise a resource distribution density computing unit for computing a resource distribution density of the sector and average resource distribution densities of two kinds of neighboring sectors of the sector according the load information of the neighboring sectors of the sector; and a relay overload determining unit for comparing the computed resource distribution density of the sector and average resource distribution density of either kind of the neighboring sectors of the sector, and for determining that the sector is relay overloaded with respect to this kind of neighboring sectors of the sector if the resource distribution density of the sector is smaller than the average resource distribution density of this kind of neighboring sectors, and determining that this kind of neighboring sectors of the sector is relay overloaded with respect to the sector if the resource distribution density of the sector is larger than the average resource distribution density of this kind of neighboring sectors.

Here, the resource distribution density of the sector may be computed according to the following formula: $m_{ki} = f_{ki}/N_{ki}$.

The average resource distribution density of the neighboring sectors may be computed according to the following formulas:

$$\overline{m_{ki'_1}} = \overline{m_{k[(i+1)mod3]}} = \frac{\sum_{(k',i+1)\in Neighbor(k,i)} \frac{f_{k'[(i+1)mod3]}}{N_{k'[(i+1)mod3]}}}{\sum_{(k',i+1)\in Neighbor(k,i)} 1} \text{ and}$$

$$\overline{m_{ki'_2}} = \overline{m_{k[(i+2)mod3]}} = \frac{\sum_{(k',i+2)\in Neighbor(k,i)} \frac{f_{k'[(i+2)mod3]}}{N_{k'[(i+2)mod3]}}}{\sum_{(k',i+2)\in Neighbor(k,i)} 1}.$$

where k represents cell k, i represents sector i, k' represents neighboring cell k' of the cell k, i' represents neighboring sector i' of the sector i, subscripts 1 and 2 of i' represent the two kinds of neighboring sectors i' of the sector i, $f_k$, represents the total number of PRBs allocated to a relay user equipment UE within sector i of cell k, and $N_{ki}$ represents the number of relay UEs within sector i of cell k.

Furthermore, the number of relay resources to be released from those allocated to the sector may be computed according to the formula $f_{ki} - \lceil N_{ki} \cdot \overline{m_{ki'}} \rceil$.

The relay resource borrowing module comprises a borrowing condition determining unit for, in case that the sector is relay overloaded with respect to either kind of the neighboring sectors of the sector, determining whether this kind of neighboring sectors have released a common relay resource; and a relay resource borrowing unit for, in case that this kind of neighboring sectors have released the common relay resource, enabling the sector to borrow the common relay resource released by this kind of neighboring sectors of the sector Preferably, the overload information may comprise a number of connected UEs, an overload indication OI, a high interference indication HII and a relative narrow band transmitting power indication RNTP; and the relay resource is physical resource blocks (PRBs) allocated to the relay UEs within a sector.

According to another aspect of the present invention, there is provided a method for inter-cell interference coordination in a relay-assistant cellular network, comprising steps of: determining, with respect to a sector, whether the sector is relay overloaded or neighboring sectors of the sector are relay overloaded according to load information of the neighboring sectors of the sector; enabling the sector to borrow relay resources released by the neighboring sectors of the sector if the sector is relay overloaded with respect to the neighboring sectors of the sector; and releasing relay resources allocated to the sector according to load information of the neighboring sectors of the sector if the neighboring sectors are relay overloaded with respect to the sector.

Here, the step for determining whether the sector is relay overloaded or the neighboring sectors of the sector are relay overloaded according to the load information of the neighboring sectors of the sector may comprise: computing a resource distribution density of the sector and average resource distribution densities of two kinds of neighboring sectors of the sector according the load information of the neighboring sectors of the sector; and comparing the computed resource distribution density of the sector and average resource distribution density of either kind of the neighboring sectors of the sector, and determining that the sector is relay overloaded with respect to this kind of neighboring sectors of the sector if the resource distribution density of the sector is smaller than the average resource distribution density of this kind of neighboring sectors, and determining that this kind of neighboring sectors of the sector is relay overloaded with respect to the sector if the resource distribution density of the sector is larger than the average resource distribution density of this kind of neighboring sector.

Here, the resource distribution density of the sector may be computed according to the following formula: $m_{ki} = f_{ki}/N_{ki}$.

The average resource distribution density of the neighboring sectors may be computed according to the following formulas:

$$\overline{m_{ki'_1}} = \overline{m_{k[(i+1)mod3]}} = \frac{\sum_{(k',i+1)\in Neighbor(k,i)} \frac{f_{k'[(i+1)mod3]}}{N_{k'[(i+1)mod3]}}}{\sum_{(k',i+1)\in Neighbor(k,i)} 1} \text{ and}$$

$$\overline{m_{ki'_2}} = \overline{m_{k[(i+2)mod3]}} = \frac{\sum_{(k',i+2)\in Neighbor(k,i)} \frac{f_{k'[(i+2)mod3]}}{N_{k'[(i+2)mod3]}}}{\sum_{(k',i+2)\in Neighbor(k,i)} 1}.$$

where k represents cell k, i represents sector i, k' represents neighboring cell k' of the cell k, $i_1$' and i' represent the two kinds of neighboring sectors of the sector i, $f_{ki}$ represents the total number of PRBs allocated to a relay UE within sector i of cell k, and $N_{ki}$ represents the number of relay UEs within sector i of cell k.

Furthermore, the number of relay resources to be released from those allocated to the sector may be computed according to the formula $f_{ki} - \lceil N_{ki} \cdot \overline{m_{ki'}} \rceil$.

Here, the step of enabling the sector to borrow relay resources released by the neighboring sectors of the sector if the sector is relay overloaded with respect to the neighboring sectors of the sector may comprise: in case that the sector is relay overloaded with respect to either kind of the neighboring sectors of the sector, determining whether this kind of neighboring sectors have released a common relay resource; and in case that this kind of neighboring sectors have released the common relay resource, enabling the sector to borrow the common relay resource released by this kind of neighboring sectors of the sector.

Preferably, the load information comprises a number of connected UEs, an overload indication OI, a high interference indication HII and a relative narrow band transmitting power indication RNTP; and the relay resource is physical resource blocks (PRBs) allocated to the relay UEs within a sector.

It can be seen from above that when the users are not distributed uniformly or the users' mobility is considered, the scheme proposed by the invention that performs adaptive dynamic ICIC resource allocation in neighboring cells may greatly improve the spectrum efficiency as compared with the conventional static ICIC scheme that equally allocates the cell edge frequency bands in the neighboring cells.

BRIEF DESCRIPTION OF THE DRAWING

The above and other aspects, features and advantages of the present invention will become more apparent from following detailed description of the nonrestrictive embodiments of the invention in conjunction with the accompanying drawings, wherein.

DETAILED DESCRIPTION OF THE INVENTION

Schematic embodiments of the present invention will now be described in details in conjunction with the accompanying drawings. In the schematic embodiments, a LTE system is taken as an example. However, those skilled in the art will understand that the invention is not limited thereto, and the schematic embodiments are only for the purpose of illustration and should be considered as examples but not any restrictions to the invention. All solutions that take advantage of embodiments of the present invention will fall within the protective scope of the invention.

An embodiment of the present invention proposes a novel solution for dynamic inter-cell interference coordination ICIC in the relay-assistant cellular network. The basic idea of the invention is: for each sector of a cell, according to the distribution condition of relay UEs in neighboring sectors of the sector, dynamically coordinating resources, i.e. physical resource blocks (PRB), allocated to the relay UEs in respective sectors between the cell and neighboring cells of the cell. In this way, for a sector with relay UEs distributed densely, it's able to borrow, from neighboring sectors with UEs distributed sparsely, sources that were previously allocated to the relay UEs in said neighboring sectors, so as to greatly improve the spectrum utilization efficiency.

Figure 4:
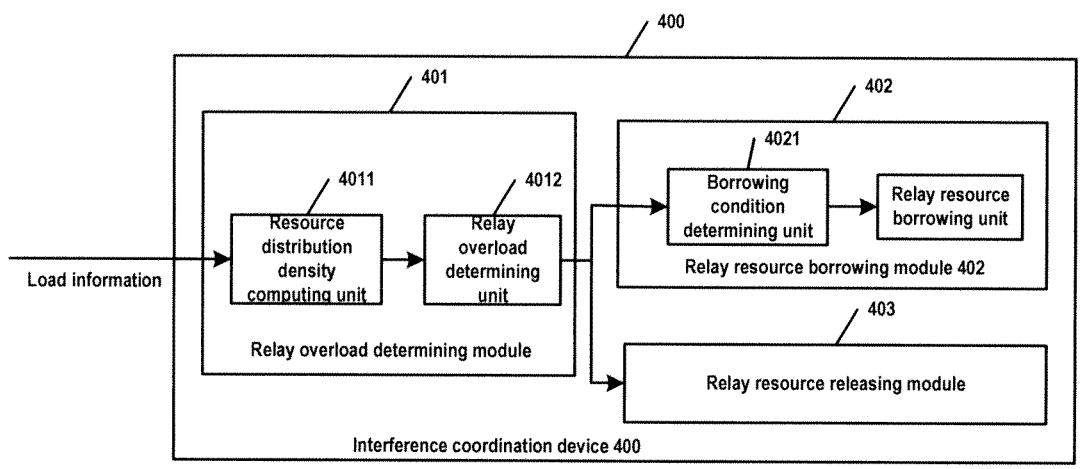
FIG. 4 illustrates a structural block diagram of an inter-cell interference coordination device 400 according to a schematic embodiment of the present invention.

FIG. 4 illustrates a structural block diagram of an inter-cell interference coordination device 400 according to a schematic embodiment of the present invention. As shown in FIG. 4, in a relay-assistant cellular network, the inter-cell interference coordination device 400 which may be implemented by an eNB may comprise: a relay overload determining module 401 for determining, with respect to a sector served by the device, whether the sector is relay overloaded or neighboring sectors of the sector are relay overloaded according to load information of the neighboring sectors of the sector (for example which may include the number of connected UEs, an overload indication OI, a high interference indication HII and a relative narrow band transmit power indication RNTP); a relay resource borrowing module 402 for enabling the sector to borrow the relay resources released by the neighboring sectors of the sector if the sector is relay overloaded with respect to the neighboring sectors of the sector (the relay resources may refer to the physical resource blocks (PRB), i.e. cell edge frequency band, allocated to relay UEs within the sector); and a relay resource releasing module 403 for releasing the relay resource allocated to the sector according to load information of the neighboring sectors of the sector if the neighboring sectors are relay overloaded with respect to the sector.

The relay overload determining module 401 comprises: a resource distribution density computing unit 4011 for computing a resource distribution density of the sector and average resource distribution densities of two kinds of neighboring sectors of the sector according to the load information of the neighboring sectors of the sector; and a relay overload determining unit 4012 for comparing the computed resource distribution density of the sector and average resource distribution density of either kind of the neighboring sectors, and for determining that the sector is relay overloaded with respect to this kind of neighboring sectors of the sector if the resource distribution density of the sector is smaller than the average resource distribution density of this kind of neighboring sectors, and determining that this kind of neighboring sectors of the sector is relay overloaded with respect to the sector if the resource distribution density of the sector is larger than the average resource distribution density of this kind of neighboring sectors.

The relay resource borrowing module 402 comprises: a borrowing condition determining unit 4021 for, in case that the sector is relay overloaded with respect to either kind of the neighboring sectors of the sector, determining whether this kind of neighboring sectors have released a common relay resource; and a relay resource borrowing unit 4022 for, in case that this kind of neighboring sectors have released the common relay resource, enabling the sector to borrow the common relay resource released by this kind of neighboring sectors of the sector.

Here, the resource distribution density of the sector may be computed according to the following formula (1):

$$m_{ki} = f_{ki}/N_{ki}. \qquad \text{formula (1)}.$$

The average resource distribution densities of the two kinds of neighboring sectors of the sector may be computed according to the following formulas (2) and (3):

$$\overline{m_{ki'_1}} = \overline{m_{k[(i+1)mod3]}} = \frac{\sum_{(k',i+1)\in Neighbor(k,i)} \frac{f_{k'[(i+1)mod3]}}{N_{k'[(i+1)mod3]}}}{\sum_{(k',i+1)\in Neighbor(k,i)} 1} \qquad \text{formula (2)}$$

$$\overline{m_{ki'_2}} = \overline{m_{k[(i+2)mod3]}} = \frac{\sum_{(k',i+2)\in Neighbor(k,i)} \frac{f_{k'[(i+2)mod3]}}{N_{k'[(i+2)mod3]}}}{\sum_{(k',i+2)\in Neighbor(k,i)} 1}. \qquad \text{formula (3)}$$

where k represents the cell k, i represents the sector i, k' represents the neighboring cell k' of the cell k, i' represents the neighboring sector of the sector i, the subscripts 1 and 2 of i' represent the two kinds of neighboring sector of the sector i, $f_{ki}$ represents the total number of PRBs allocated to a relay user equipment UE within sector i of cell k, and $N_{ki}$ represents the number of relay UEs within sector i of cell k.

Furthermore, the number of relay resources to be released from those allocated to the sector is computed according to the formula (4):

$$f_{ki} - \lceil N_{ki} \cdot \overline{m_{ki'}} \rceil \qquad \text{formula (4)}$$

Although the eNB of an embodiment of the invention is described in form of discrete functional modules, each component shown in FIG. 4 may be implemented in practice by a plurality of devices and the plurality of components shown may be integrated into one chip or one device neighboring. The eNB may comprise any other unit(s) for other purposes.

In the following, the method for inter-cell interference coordination according to an embodiment of the invention will be described with reference to FIGS. 5-8, where the LTE FDD downlink transmission is taken as an example. It will be understood that the invention is not limited thereto and may be applied to other wireless realms.

Figure 5:
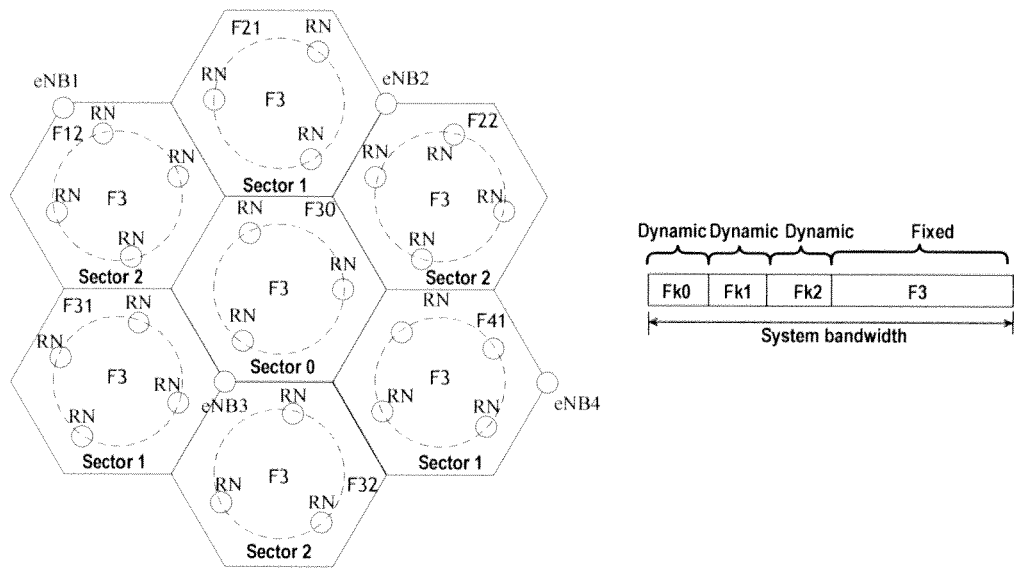
FIG. 5 illustrates a multi-cell arrangement with relays and the corresponding resource allocation according to an embodiment of the present invention.

FIG. 5 illustrates a multi-cell arrangement with relays and the corresponding resource allocation. As shown in FIG. 5, there're 4 eNBs shown in this arrangement with reference numbers eNB1, eNB2, eNB3, and eNB4, respectively. For eNBk (k=1, 2, 3, 4), the cell k served by the eNBk comprises three sectors, i.e. sector 0, 1, and 2. The cell edge frequency band Fk0 is allocated to the relay UEs in sector 0, the cell edge frequency band Fk1 is allocated to the relay UEs in sector 1, the cell edge frequency band Fk2 is allocated to the relay UEs in sector 2, and the cell center frequency bands F3 are allocated to the macro UEs of sector 0, 1, and 2.

Figure 6:
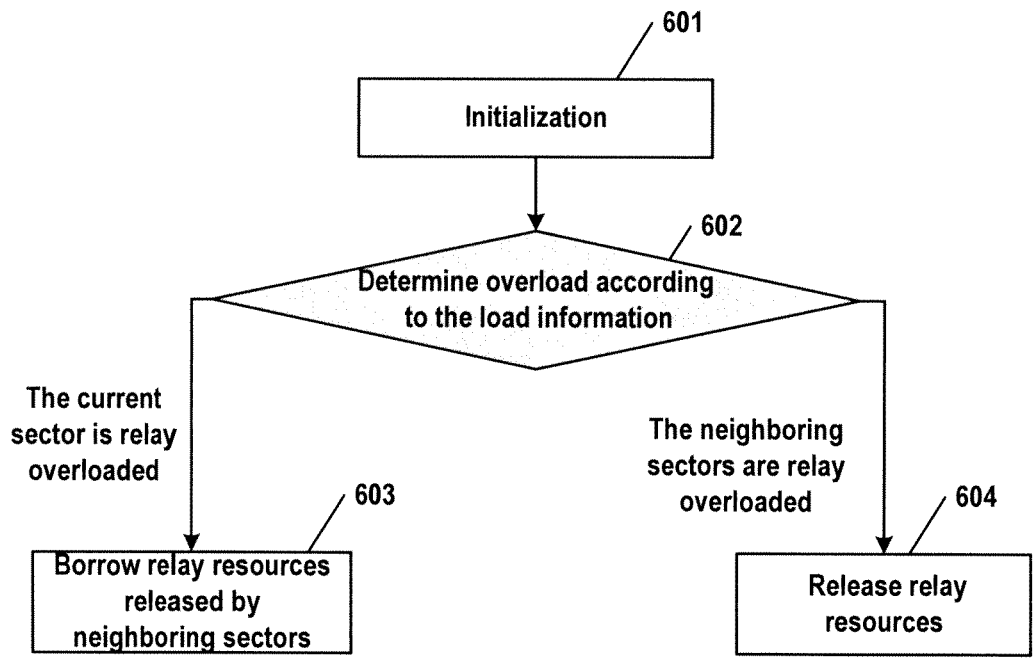
FIG. 6 illustrates a flow chart of a dynamic inter-cell interference coordination ICIC scheme under the multi-cell arrangement of FIG. 5 according to an embodiment of the present invention.

FIG. 6 illustrates a flow chart of a dynamic inter-cell interference coordination ICIC scheme under the multi-cell arrangement of FIG. 5 according to an embodiment of the present invention.

Figure 1:
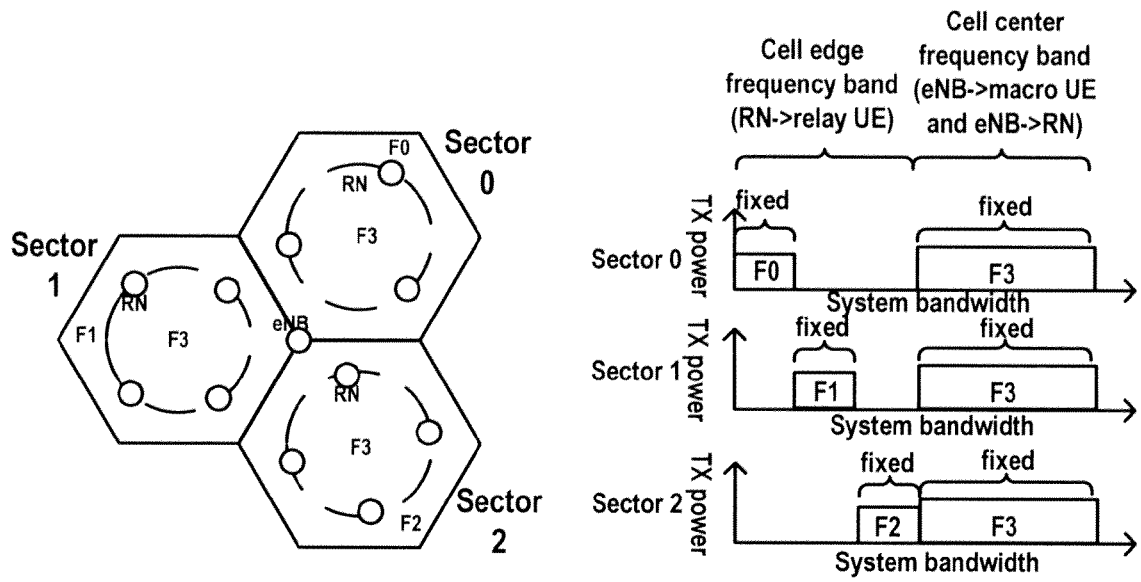
FIG. 1 illustrates a schematic drawing of a static ICIC scheme in prior arts.
Figure 2:
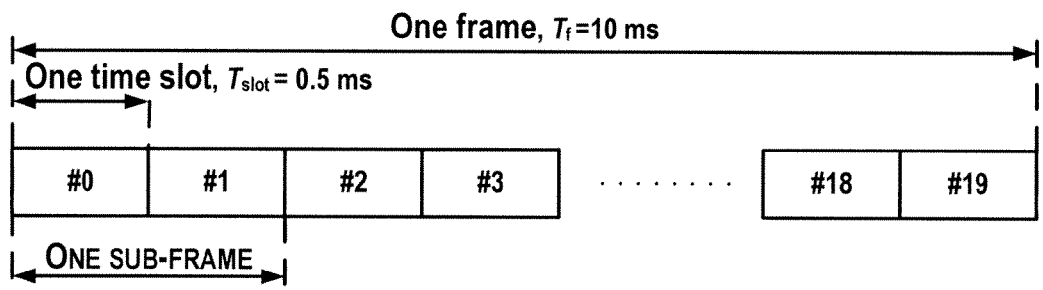
FIG. 2 illustrates a typical LTE FDD downlink frame structure.
Figure 7A:
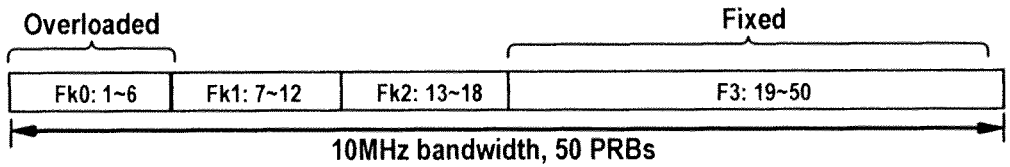
FIGS. 7a and 7b illustrate a resource allocation of the dynamic ICIC scheme in case of the frame structure shown in FIG. 2 according to an embodiment of the present invention.
Figure 7B:
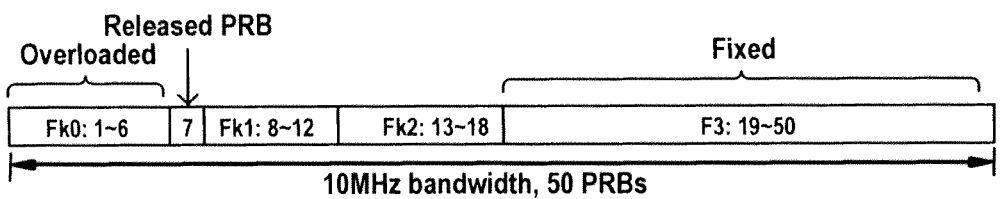

FIGS. 7a and 7b illustrate a resource allocation of the dynamic ICIC scheme in case of the frame structure shown in FIG. 2 according to an embodiment of the present invention.

Also taking the typical LTE FDD downlink frame structure shown in FIG. 2 as an example, the total number of physical resource blocks (PRBs) in each sub-frame is 50 in case that the system bandwidth is 10 MHz.

Figure 3:
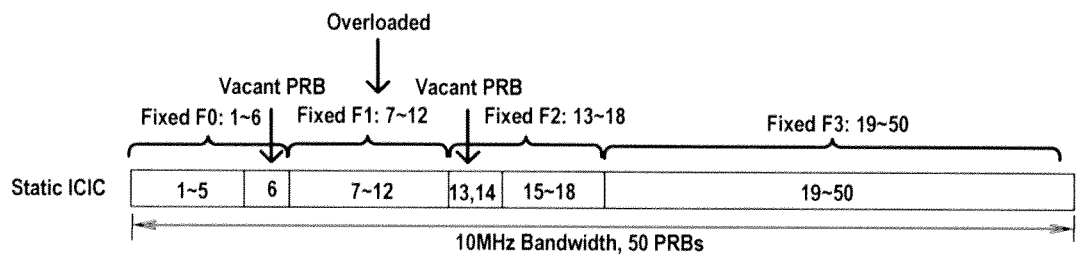
FIG. 3 illustrates a diagram of resource allocation of the static ICIC scheme in case of the frame structure shown in FIG. 2.

At step 601, an initial cell resource allocation is performed. Similar to what is shown in FIG. 3, for the eNBk, the relay UEs in sectors 0, 1 and 2 are allocated with 6 PRBs respectively, i.e. the cell edge frequency bands Fk0 (corresponding to PRB1-PRB6), Fk1 (corresponding to PRB7-PRB12) and Fk2 (corresponding to PRB13-PRB18) are allocated to the sectors 0, 1 and 2 respectively, and for the macro UEs of sectors 0, 1 and 2, 32 PRBs, i.e. the cell center frequency band F3 (corresponding to PRB19-PRB50), are allocated.

For the sake of description, the sectors 0, sectors 1, and sectors 2 are called as three kinds of sectors in the multi-cell arrangement.

At step 602, it is determined for a sector whether the sector is relay overloaded or the neighboring sectors of the sector is relay overloaded according to load information of the neighboring sectors of the sector. Step 603 is performed if the sector is relay overloaded with respect to the neighboring sectors of the sector, and step 604 is performed if the neighboring sectors of the sector are overloaded with respect to the sector.

As shown in FIG. 5, this step is explained taking sector 0 of eNB3 as an example. The sector 0 is neighboring to sector 2 of eNB1, sectors 1 and 2 of eNB2 and sector 1 of eNB4. The eNB3 communicates with eNB1, eNB2, eNB4 through X2 interfaces and determines relay overload statuses of these sectors according to load information from these neighboring eNBs about these neighboring sectors.

a. The eNB3 may compute the resource distribution density $m_{ki}$ of the sector 0 of eNB3, i.e. the number of PRBs allocated for each relay UE within the sector 0, according to the formula (1).

b. The eNB3 may compute average resource distribution densities $\overline{m_{ki_1'}}$ and $\overline{m_{ki_2'}}$ of two kinds of neighboring sectors of the sector 0 according to the formulas (2) and (3), where $\overline{m_{ki_1'}}$ represents the average resource distribution density of one kind of sectors around sector i, and $\overline{m_{ki_2'}}$ represents the average resource distribution density of another kind of sectors around sector i. Taking sector i being the sector 0 of eNB3 as an example, $\overline{m_{ki_1'}}$ represents the average resource distribution density of three sectors 1 (the sectors in right above, lower left, and lower right in FIG. 5) around sector 0, and $\overline{m_{ki_2'}}$ represents the average resource distribution density of three sectors 2 (the sectors in right below, upper left, and upper right in FIG. 5) around sector 0.

c. If $m_{ki} < \overline{m_{ki'}}$, determined that the sector i is relay overloaded and then step 603 is performed; otherwise if $m_{ki} > \overline{m_{ki'}}$, it's determined that the sector is relay overloaded and then step 604 is performed.

As shown in FIG. 7a, Taking sector i being the sector 0 of eNB3 as an example, if $m_{ki} < \overline{m_{ki'}}$, eNB3 determines that the sector 0 is relay overloaded with respect to the three sectors 1 around the sector 0 and then step 603 is performed. If $m_{ki} > \overline{m_{ki'}}$, eNB3 determines that the three sectors 1 around the sector 0 is relay overloaded with respect to the sector 0 and then step 604 is performed.

At step 603, the sector is enabled to borrow relay resources released by the neighboring sectors of the sector.

In the embodiment, it is determined whether the three sectors 1 have all released a common PRB. As shown in FIG. 7b, if the three sectors 1 each released a PRB7, i.e., none of the relays in the three sectors 1 uses PRB7, the relay in the sector 0 may borrow the PRB7, i.e. using the PRB7 that is no more used by the three sectors 1. In this way, the resource allocation transits from the initial state in FIG. 7a to a coordinated state in FIG. 7b.

At step 604, the relay resource allocated to the sector is released according to the load information of the neighboring sectors.

The eNB3 computes the number of relay resources to be released from those allocated to the sector according to the formula (4). Assuming it's computed by eNB3 that $f_{ki} - \lceil N_{ki} \cdot \overline{m_{ki'}} \rceil = 2$, then eNB3 enables sector 0 to release resources neighboring to the sector 1, i.e., two PRBs (i.e. PRB 5 and PRB 6) for borrowing by the three sectors 1.

So far, the eNB3 completes the processing for one sector in the eNB3 by coordinating with three eNBs neighboring to the eNB3.

The eNB3 may also perform the above processing on its sectors 1 and 2.

Figure 8A:
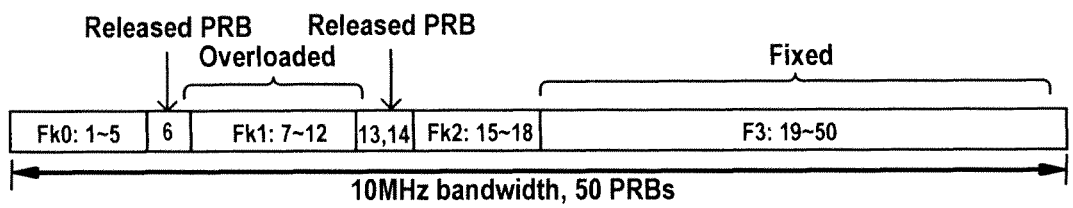
FIGS. 8a and 8b illustrate another resource allocation of the dynamic ICIC scheme in case of the frame structure shown in FIG. 2 according to a embodiment of the present invention.
Figure 8B:
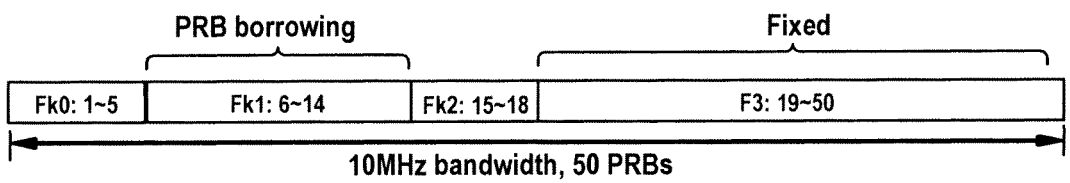

FIGS. 8a and 8b illustrate another resource allocation of the dynamic ICIC scheme in case of the frame structure shown in FIG. 2 according to an embodiment of the present invention. As shown in FIGS. 8a and 8b, if sector 1 is overloaded, it is determined whether the three sectors 0 around the sector 1 have released a common PRB and whether the three sectors 2 around the sector 1 have released a common PRB. In this embodiment, it's assumed that the three sectors 0 each has released a common PRB6 and the three sectors 2 each has released common PRBs 13 and 14, then the sector 1 will borrow the PRB6 and the PRBs 13 and 14. In this way, the resource allocation transits from the initial state in FIG. 8a to the state in FIG. 8b. Similarly, the corresponding computation and determination may be performed on the sector 2 to coordinate resource allocation.

The eNB3 may implement the processing of the three sectors of the eNB3 through the coordination with six eNBs around the eNB3. In this way, each eNB performs the same processing as the eNB3, such that each eNB will continuously coordinate with its six neighboring eNBs to dynamically allocate sources for the relay UEs in respective sectors.

The following table 1 lists the parameters employed when making simulation using the method and device of the invention in the wireless cellular system.

The following table 2 lists the simulation result based on the parameter configuration of Table 1.

TABLE 2

|  | Conventional static ICIC | Dynamic ICIC proposed by the invention |
|---|---|---|
| Cell average spectrum efficiency (bps/Hz/cell) | 1.2608 | 1.7009 (34.9%) |
| Cell edge spectrum efficiency (bps/Hz) | 0.0222 | 0.0247 (11.1%) |

In the simulating process, the distribution of UEs is set to be not uniform, and the distribution varies randomly for each time period. It can be seen from the simulation result that using the method proposed by the embodiments of the present

TABLE 1

| Parameter | Value |
|---|---|
| Cellular layout | Hexagonal layout with wrap around, 7 base station eNodeBs, 3 cells per eNodeB |
| System bandwidth | 10 MHz, downlink |
| ISD (Inter-site distance) | 500 m (3GPP Case 1) |
| Base station eNodeB power | 46 dBm |
| Relay RN Tx power | 30 dBm |
| Number of relay RNs per sector | 2 |
| Number of user equipments UEs per sector | 25 |
| Scheduling strategy | Proportional Fairness |
| Downlink HARQ | Asynchronous HARQ with CC (Chasing Combing), Maximum three retransmissions and hop-by-hop HARQ in the relay network |
| Channel model | SCM urban macro high spread for 3GPP case 1 |
| Base station eNodeB antenna configuration | 1 Tx antenna with antenna pattern defined in 3GPP TS 36.814 V1.5.1 |
| Relay RN antenna configuration | 1 Tx antenna and 2 Rx antennas with antenna pattern defined in 3GPP TS 36.814 V1.5.1 |
| user equipment UE antenna configuration | 2 Rx antennas (0 dBi antenna gain, omni-directional) |
| Downlink receiver type | MRC (maximum ratio combiner) |
| Control channel overhead, ACK, etc. | LTE: L = 3 symbols for DL CCHs, overhead for demodulated reference signals |
| Path-loss model — eNodeB to UE | $L = \text{Prob}(R)PL_{LOS}(R) + [1 - \text{Prob}(R)]PL_{NLOS}(R)$, for 2 GHz, R in km. Penetration loss 20 dB<br>$PL_{LOS}(R) = 103.4 + 24.2\log10(R)$<br>$PL_{NLOS}(R) = 131.1 + 42.8\log10(R)$<br>Case 1: $\text{Prob}(R) = \min(0.018/R, 1) * (1 - \exp(-R/0.063)) + \exp(-R/0.063)$<br>Case 3: $\text{Prob}(R) = \exp(-(R - 0.01)/1.0)$ |
| Path-loss model — eNodeB to RN | $L = \text{Prob}(R)PL_{LOS}(R) + [1 - \text{Prob}(R)]PL_{NLOS}(R) - B$, for 2 GHz, R in km, wherein,<br>$PL_{LOS}(R) = 100.7 + 23.5\log10(R)$<br>$PL_{NLOS}(R) = 125.2 + 36.3\log10(R)$<br>Prob(R) based on ITU models:<br>Case 1: $\text{Prob}(R) = \min(0.018/R, 1) * (1 - \exp(-R/0.072)) + \exp(-R/0.072)$<br>Case 3: $\text{Prob}(R) = \exp(-(R - 0.01)/1.15)$<br>where for the RNs in donor cell, B = 5 dB; for the RNs in other cells, B = 0 dB |
| Path-loss model — RN to UE | $L = \text{Prob}(R) PL_{LOS}(R) + [1 - \text{Prob}(R)]PL_{NLOS}(R)$, for 2 GHz, R in km, where<br>$PL_{LOS}(R) = 103.8 + 20.9\log10(R)$<br>$PL_{NLOS}(R) = 145.4 + 37.5\log10(R)$<br>Case 1: $\text{Prob}(R) = 0.5 - \min(0.5, 5\exp(-0.156/R)) + \min(0.5, 5\exp(-R/0.03))$<br>Case 3: $\text{Prob}(R) = 0.5 - \min(0.5, 3\exp(-0.3/R)) + \min(0.5, 3\exp(-R/0.095))$ | invention, both the cell average spectrum efficiency and the cell edge spectrum efficiency are improved.

Figure 9:
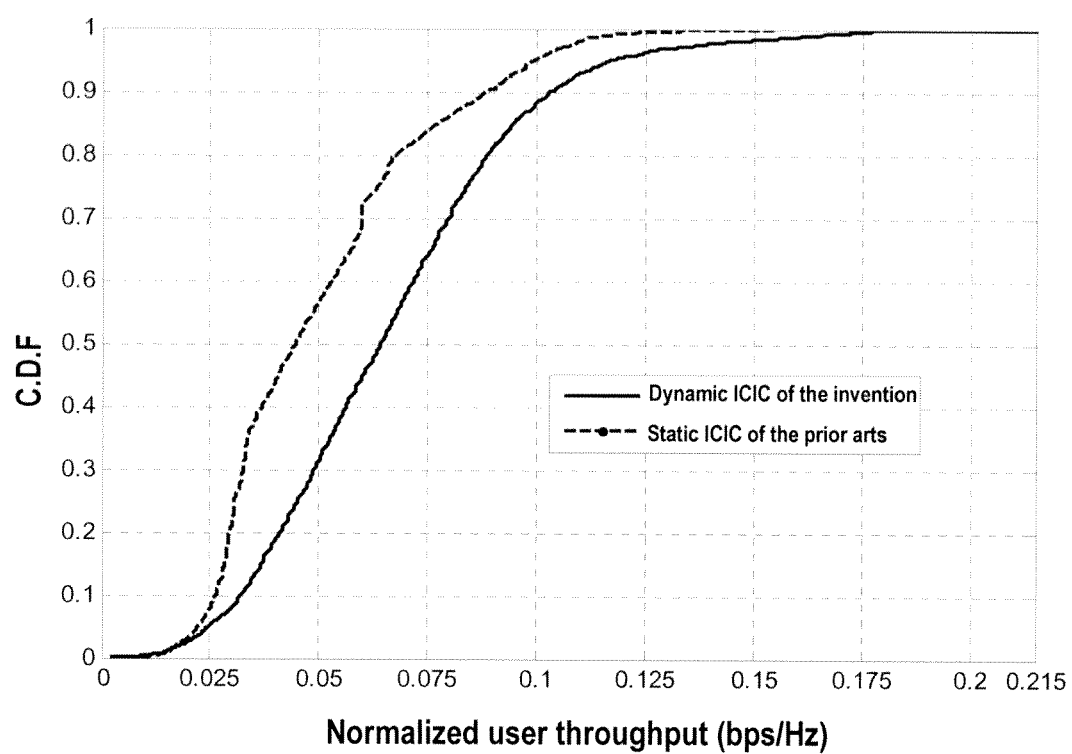
FIG. 9 illustrates performance evaluation of the method and device of the invention in a wireless cellular system.

FIG. 9 illustrates performance evaluation of the method and device of the invention in a wireless cellular system. It can be seen from FIG. 9 that the dynamic ICIC scheme proposed by the invention has greatly improved the performance as compared with the conventional static ICIC scheme.

As a conclusion, the resource waste due to the nonuniform distribution of the relay UEs and the movement of the relay UEs is reduced and the spectrum efficiency is greatly improved by dynamically coordinating the resources allocated to the relay UEs according to the distribution conditions of the relay UEs.

A person of skill in the art would readily recognize that steps of various above described methods may be performed by programmed computers. Herein, some embodiments are also intended to cover machine or computer readable program storage devices, e.g., digital data storage media, and encoded machine executable or computer executable programs of instructions, wherein said instructions perform some or all of the steps of said above described methods. The program storage devices may be, e.g., digital storage, magnetic storage media such as magnetic disks and magnetic tapes, hard drives, or optically readable digital data storage media. The embodiments are also intended to cover computers programmed to execute programs recorded on storage media to perform said steps of the above described methods.

The description described in connection with the drawings are merely provided to illustrate the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. A device for inter-cell interference coordination in a relay-assistant cellular network, comprising:
   the device comprising:
   a relay overload determining module for determining, with respect to a sector served by the device, whether the sector is relay overloaded or neighboring sectors of the sector are relay overloaded according to load information of the neighboring sectors of the sector;
   a relay resource borrowing module for enabling the sector to borrow relay resources released by the neighboring sectors of the sector if the sector is relay overloaded with respect to the neighboring sectors of the sector; and
   a relay resource releasing module for releasing relay resources allocated to the sector according to load information of the neighboring sectors of the sector if the neighboring sectors are relay overloaded with respect to the sector;
   wherein the relay overload determining module comprises:
   a resource distribution density computing unit for computing a resource distribution density of the sector and average resource distribution densities of two kinds of neighboring sectors of the sector according to the load information of the neighboring sectors of the sector; and
   a relay overload determining unit for comparing the computed resource distribution density of the sector and average resource distribution density of either kind of the neighboring sectors of the sector, and for determining that the sector is relay overloaded with respect to this kind of neighboring sectors of the sector if the resource distribution density of the sector is smaller than the average resource distribution density of this kind of neighboring sectors, and determining that this kind of neighboring sectors of the sector is relay overloaded with respect to the sector if the resource distribution density of the sector is larger than the average resource distribution density of this kind of neighboring sectors.

2. The device of claim 1, wherein the resource distribution density of the sector is computed according to the following formula $$m_{ki} = f_{ki}/N_{ki}; \text{ and}$$

the average resource distribution density of the neighboring sectors is computed according to the following formulas:

$$\overline{m_{ki'_1}} = \overline{m_{k[(i+1)mod3]}} = \frac{\sum_{(k',i+1)\in Neighbor(k,i)} \frac{f_{k'[(i+1)mod3]}}{N_{k'[(i+1)mod3]}}}{\sum_{(k',i+1)\in Neighbor(k,i)} 1} \text{ and}$$

$$\overline{m_{ki'_2}} = \overline{m_{k[(i+2)mod3]}} = \frac{\sum_{(k',i+2)\in Neighbor(k,i)} \frac{f_{k'[(i+2)mod3]}}{N_{k'[(i+2)mod3]}}}{\sum_{(k',i+2)\in Neighbor(k,i)} 1};$$

where k represents cell k, i represents sector i, k' represents neighboring cell k' of the cell k, i' represents neighboring sector i' of the sector i, subscripts 1 and 2 of i' represent the two kinds of neighboring sectors i' of the sector i, $f_{ki}$ represents the total number of PRBs allocated to a relay user equipment UE within sector i of cell k, and $N_{ki}$ represents the number of relay UEs within sector i of cell k.

3. The device of claim 2, wherein the number of relay resources to be released from those allocated to the sector is computed according to the formula $$f_{ki} - \lceil N_{ki} \cdot \overline{m_{ki'}} \rceil.$$

4. The device of claim 1, wherein the relay resource borrowing module comprises:
   a borrowing condition determining unit for, in case that the sector is relay overloaded with respect to either kind of the neighboring sectors of the sector, determining whether this kind of neighboring sectors have released a common relay resource; and
   a relay resource borrowing unit for, in case that this kind of neighboring sectors have released the common relay resource, enabling the sector to borrow the common relay resource released by this kind of neighboring sectors of the sector.

5. The device of claim 1, wherein
   the load information comprises a number of connected UEs, an overload indication OI, a high interference indication HII and a relative narrow band transmitting power indication RNTP; and the relay resource is physical resource blocks (PRBs) allocated to the relay UEs within a sector.

6. A method for inter-cell interference coordination in a relay-assistant cellular network, comprising:
via a processing device, determining, with respect to a sector, whether the sector is relay overloaded or neighboring sectors of the sector are relay overloaded according to load information of the neighboring sectors of the sector;
enabling the sector to borrow relay resources released by the neighboring sectors of the sector if the sector is relay overloaded with respect to the neighboring sectors of the sector; and
releasing relay resources allocated to the sector according to load information of the neighboring sectors of the sector if the neighboring sectors are relay overloaded with respect to the sector;
wherein determining whether the sector is relay overloaded or the neighboring sectors of the sector are relay overloaded according to the load information of the neighboring sectors of the sector comprises:
computing a resource distribution density of the sector and average resource distribution densities of two kinds of neighboring sectors of the sector according to the load information of the neighboring sectors of the sector; and
comparing the computed resource distribution density of the sector and average resource distribution density of either kind of the neighboring sectors of the sector, and determining that the sector is relay overloaded with respect to this kind of neighboring sectors of the sector if the resource distribution density of the sector is smaller than the average resource distribution density of this kind of neighboring sectors, and determining that this kind of neighboring sectors of the sector is relay overloaded with respect to the sector if the resource distribution density of the sector is larger than the average resource distribution density of this kind of neighboring sector.

7. The method of claim 6, wherein,
the resource distribution density of the sector is computed according to the following formula:

$m_{ki} = f_{ki}/N_{ki}$; and the average resource distribution density of the neighboring sectors is computed according to the following formulas:

$$\overline{m}_{ki'_1} = \overline{m}_{k[(i+1)mod3]} = \frac{\sum_{(k',i+1)\in Neighbor(k,i)} \frac{f_{k'[(i+1)mod3]}}{N_{k'[(i+1)mod3]}}}{\sum_{(k',i+1)\in Neighbor(k,i)} 1} \text{ and}$$

$$\overline{m}_{ki'_2} = \overline{m}_{k[(i+2)mod3]} = \frac{\sum_{(k',i+2)\in Neighbor(k,i)} \frac{f_{k'[(i+2)mod3]}}{N_{k'[(i+2)mod3]}}}{\sum_{(k',i+2)\in Neighbor(k,i)} 1};$$

where k represents cell k, i represents sector i, k' represents neighboring cell k' of the cell k, $i_1'$ and $i_2'$ represent the two kinds of neighboring sectors of the sector i, $f_{ki}$ represents the total number of PRBs allocated to a relay UE within sector i of cell k, and $N_{ki}$ represents the number of relay UEs within sector i of cell k.

8. The method of claim 7, wherein the number of relay resources to be released from those allocated to the sector is computed according to the formula $f_{ki} - \lceil N_{ki} \cdot \overline{m}_{ki'} \rceil$.

9. The method of claim 6, wherein the step of enabling the sector to borrow relay resources released by the neighboring sectors of the sector if the sector is relay overloaded with respect to the neighboring sectors of the sector comprises:
in case that the sector is relay overloaded with respect to either kind of the neighboring sectors of the sector, determining whether this kind of neighboring sectors have released a common relay resource; and
in case that this kind of neighboring sectors have released the common relay resource, enabling the sector to borrow the common relay resource released by this kind of neighboring sectors of the sector.

10. The method of claim 6, wherein
the load information comprises a number of connected UEs, an overload indication OI, a high interference indication HII and a relative narrow band transmitting power indication RNTP; and
the relay resource is physical resource blocks (PRBs) allocated to the relay UEs within a sector.

* * * * *